E. L. WILLIAMS.
MILLING MACHINE.
APPLICATION FILED JULY 8, 1918.

1,339,490.

Patented May 11, 1920.
2 SHEETS—SHEET 1.

Witness
W. H. Richmond

Inventor
E. L. Williams
By Craig Ray Bain
Attys.

E. L. WILLIAMS.
MILLING MACHINE.
APPLICATION FILED JULY 8, 1918.
1,339,490.
Patented May 11, 1920.
2 SHEETS—SHEET 2.
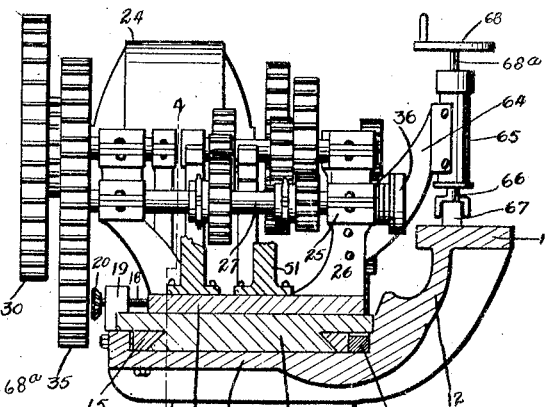
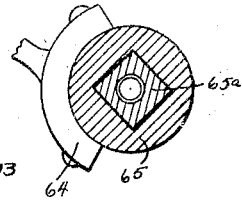
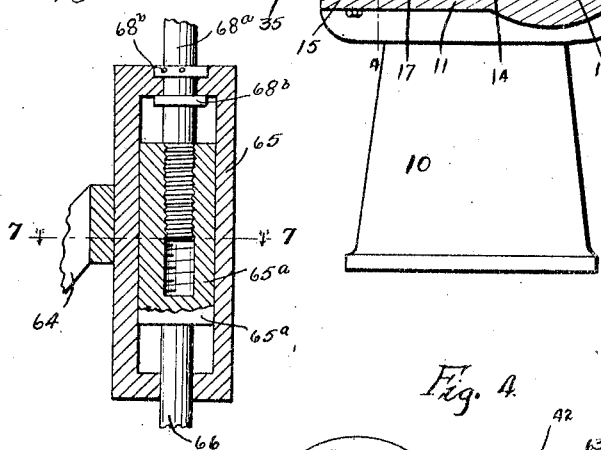
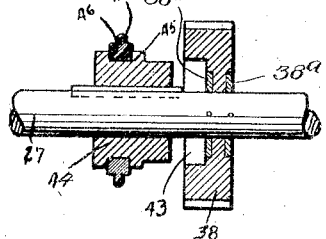
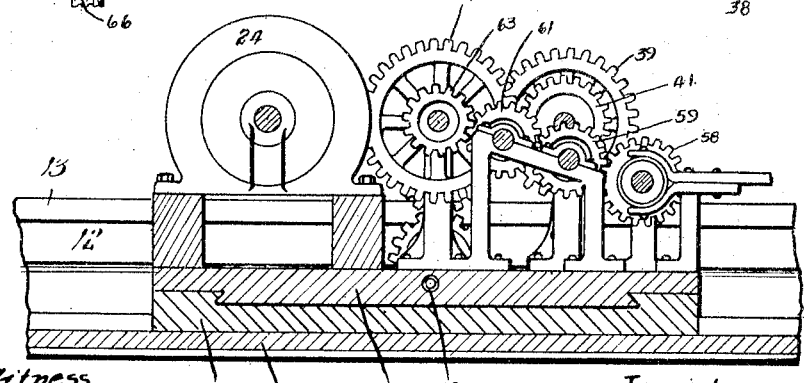

UNITED STATES PATENT OFFICE.

ENOCH L. WILLIAMS, OF MARSHALLTOWN, IOWA.

MILLING-MACHINE.

1,339,490.  Specification of Letters Patent.  Patented May 11, 1920.

Application filed July 8, 1918. Serial No. 243,860.

*To all whom it may concern:*

Be it known that I, ENOCH L. WILLIAMS, of Marshalltown, in the county of Marshall and State of Iowa, have invented a certain new and useful Milling-Machine, of which the following is a specification.

The object of my invention is to provide a milling machine of simple, durable and inexpensive construction.

A further object is to provide such a machine whereby the edges of strips of metal may be milled either on lines at right-angles to the surfaces of the sheets or so as to form beveled edges as in the case of plates for sub-marines or the like.

Still a further object is to provide such a machine having suitable mechanism for operating the cutting tool.

Still a further object is to provide such a machine having a movable carriage for carrying the cutting tool along the strip or sheet of metal to be milled, and to provide suitable mechanism for operating the cutting tool during the movement of the carriage, and for returning the cutting tool to starting position.

Still a further object is to provide such a machine having a bevel for supporting the sheet or strip to be cut and to provide a suitable mechanism for operating the cutting tool and to provide for supporting such mechanism, a carriage adapted to move longitudinally of the machine, and a carriage member adapted to move laterally of the machine for securing proper adjustment of the cutting tool.

Still a further object is to provide such a device having a member designed to travel and press against the metal being cut adjacent to the cutting tool for preventing any buckling of the sheet or strip which is being cut.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Fig. 3 shows a transverse, sectional view taken on the line 3—3 of Fig. 2.

Fig. 4 shows a vertical, longitudinal, sectional view taken on the line 4—4 of Fig. 3.

Fig. 5 shows a vertical, sectional view taken on the line 5—5 of Fig. 1.

Fig. 6 shows a vertical, central, sectional view of a portion of my improved device; and Fig. 7 shows a view taken on the line 7—7 of Fig. 6.

Figure 2:
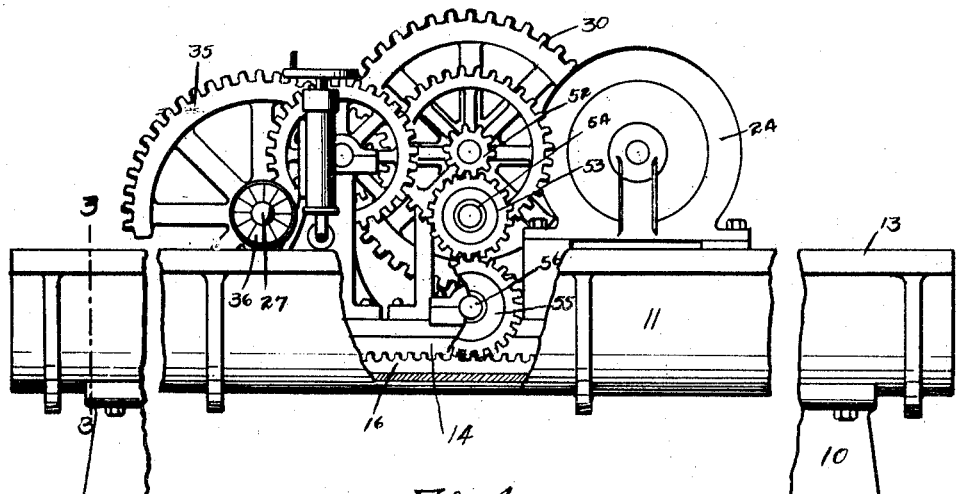
Fig. 2 shows a side elevation of the same, parts being cut away to show part of the operating mechanism.
Figure 1:
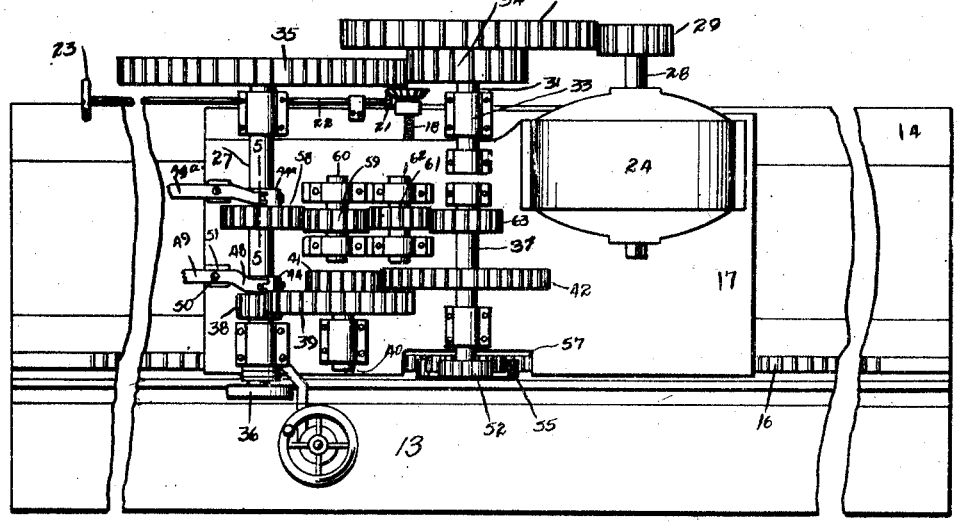
Figure 1 shows a top or plan view of a milling machine embodying my invention.

In the accompanying drawings, I have used the reference numeral 10 to indicate generally the supporting pedestal or base on which the operative parts of my improved machine are supported.

At the upper part of the base 10 is a longitudinally arranged bed 11 having a laterally, upwardly, projecting portion 12 provided at its upper end with a work supporting platform or table 13 for the sheets or plates of metal.

Slidably supported on the bed 11 is a carriage member 14 capable of movement longitudinally in the machine.

Supported by the bed 11 and suitably arranged with relation to the carriage member 14 are guides 15 which form a guideway for said carriage.

Resting on the bed 11 is a rack bar 16 having teeth on its upper surface.

Dove-tailed into the upper surface of the carriage 14 is a transversely, slidable carriage member 17 on which is supported the operative mechanism hereinafter described.

For moving the carriage member 17 laterally with relation to the carriage member 14 and the main body of the machine the following means has been provided.

Mounted in a screw-threaded, transverse opening in the carriage member 17 is a screw-threaded rod 18 which projects laterally and is rotatably but non-slidably mounted in a bearing 19 on the carriage member 14.

On the outer end of the rod 18 is a beveled gear 20 in mesh with a beveled gear 21 on a shaft 22 mounted in suitable bearings and extending laterally along the side of the carriage member 14, having at its end a hand-wheel 23.

Suitably supported on the carriage member 17 is a motor 24.

Mounted in suitable bearings 25 at the upper part of brackets 26 of the carriage member 17 is a transverse shaft 27.

On a motor shaft 28 is a gear 29 which meshes with a gear 30 on a stub shaft 31 supported on suitable brackets 33 on the movable carriage member 17.

On the shaft 31 is a gear 34 which meshes with a gear 35 on the shaft 27.

On the shaft 27 is suitably mounted the cutter tool 36 which, it will be understood, is detachable and interchangeable with other suitable cutting tools.

For causing the carriage member 14 to travel along the machine the following additional mechanism is provided.

Suitably mounted on the carriage member 17 is a shaft 27. On the shaft 27 is a smaller gear 38 which meshes with a larger gear 39 on a short shaft 40, and a gear 41 on the shaft 40 meshes with a gear 42 on the shaft 37.

The gear 38 is rotatably but non-slidably mounted on the shaft 27 in any suitable way as by the fixed collars 38$^a$ and 38$^b$.

The gear 38 has formed in it an angular socket 43.

Slidably but non-rotatably mounted on the shaft 27 is a clutch member 44 designed to coact with the socket 43, which socket forms a clutch member.

The clutch member 44 is provided with an annular groove 45 in which is rotatably mounted a band 46 having opposite outwardly extending pins 47, which extend into slots in the arms 48 of the controlling lever 49 pivoted at 50 on a bracket 51 on the movable carriage member 17.

By throwing the clutch member into engagement when the motor is operating, it will be seen that rotation may be imparted from the motor shaft 28 to the shaft 37.

On the shaft 37 is a gear 52 which meshes with a gear 53 on a stub shaft 54. The gear 53 meshes with a gear 55 on another stub shaft 56. All the shafts are mounted on the carriage member 17.

The gear 55 projects through an opening or slot 57 in the movable carriage member 17 and meshes with the rack 16.

It will be seen that through the chains of gearing hereinbefore described the gear 55 may be operated for causing the operative mechanism and the carriage member 14 to travel longitudinally of the machine.

For reversing the direction of travel of the gear 55 and the shaft 37, for causing the carriage member 14 to travel in the opposite direction in the machine, another chain of gearing is provided.

On the shaft 27 is rotatably but non-slidably mounted a gear 58 which meshes with a gear 59 on a shaft 60. The gear 59 meshes with a gear 61 on a shaft 62, and the gear 61 meshes with a gear 63 on the shaft 37.

The lever 49$^a$ is operatively connected with the clutch member 44$^a$ and to the gear 58 by means similar to that described for connecting the lever 49 with the gear 38.

On the movable carriage member 17 is a laterally and upwardly projecting bracket 64 supporting a collar or the like 65 which correspondingly supports a shaft 66 which carries a roller 67. The roller 67 may be vertically adjusted by means of a hand-wheel 68 in any suitable way as by forming the collar 65 with a squared opening extending from a point adjacent to the lower end thereof upwardly. In such squared opening a square block 65$^a$ may be mounted to reciprocate on a vertical line. The block 65$^a$ has a central, threaded opening therein, designed to receive a similarly threaded shaft 68$^a$, whereby rotation of the shaft 68$^a$ may raise and lower the block 65$^a$. The block 65$^a$ is connected with the shaft 66 and slidably extended through the bottom of the casing 65, whereby vertical reciprocation of the block may cause similar reciprocation of the roller 67.

The shaft 68$^a$ is prevented from vertical reciprocation by any suitable means, as by collars 68$^b$ mounted above and below the upper web of the casing or collar 65.

In the practical operation of my improved machine, the plate or strip to be operated upon is supported on the platform 13 and bolted or otherwise secured thereto.

The carriage member 14 is adjusted at its position at the right-hand end of the machine, as shown in Fig. 2.

The clutch member 44$^a$ is thrown out of gear. The clutch member 44 is thrown into gear. The movable carriage member 17 is adjusted laterally in the machine by means of the hand-wheel 23 and the parts connected therewith, until the milling tool 36 is in proper position with relation to the sheet resting on the platform 13.

The roller 67 rests on the sheet to be cut in position quite close to the cutting tool or milling tool 36.

When the motor is started, it will be seen that the cutting tool will be operated and that the movable carriage member 14 and all the parts supported thereon are moved slowly along the machine toward the left by means of the gears 29, 30, 34, and 35, the shaft 27, the clutch member 44, the gears 38, 39, 41, and 42, the shaft 37 and the gears 52, 53, and 55, and the rack 16.

When a cut has been made the length of the strip operated upon or the length of the travel of the movable carriage member 14, the clutch member 44 is thrown out of gear and the clutch member 44$^a$ is thrown into gear and the carriage member 14 will be moved toward the right.

The chains of gearing are so arranged that the movement of the parts toward the left is slow while the return movement toward the right is comparatively fast.

When the parts have again moved to the right-hand end of the machine the hand-wheel 23 is manipulated for moving the carriage member 17 and the parts supported thereon slightly toward the platform 13 for moving the cutter tool 36 to position for making another cut. It will be noted that the movement of the carriage member 17 is comparatively slight so that the gear 55 remains meshed with the rack 16, but means may be provided, if necessary, for permitting greater relative movement.

By using the roller 67 and pressing it against the sheet or strip operated upon, said sheet or strip is held against buckling during the cutting operation.

It will be seen that my machine is of comparatively simple and inexpensive construction. That a quick and easy adjustment of the cutting tool toward and from the work may be had, and that the return movement of the carriage member 14 is comparatively rapid so as to save time.

All the working parts are supported on the movable carriage so as to travel with them.

Some changes may be made in the construction and arrangement of the parts of my improved milling tool without departing from the essential features and purposes of my invention, and it is my intention to cover by my claims any modified forms of structure or use of mechanical equivalents which may be included within the scope of my claims.

I claim as my invention:

1. In a device of the class described, a bed including a guideway and a work supporting table adjacent thereto, a carriage mounted for longitudinal reciprocation in said guideway, a second carriage mounted on the first for lateral reciprocation relative thereto, a cutting tool mounted on the second carriage adapted to operate against work secured to the supporting table, and an adjustable device carried by the second carriage and adapted to press against the work on the supporting table adjacent to said cutting tool.

2. In a device of the class described, a bed including a guideway and a work supporting table adjacent thereto, a carriage mounted for longitudinal reciprocation in said guideway, a second carriage mounted on the first for lateral reciprocation relative thereto, a cutting tool mounted on the second carriage adapted to operate against work secured to the supporting table, an arm extended from the second carriage to position above the supporting table and adjacent to the cutting tool, and an adjustable device carried by said arm designed to press against work on the supporting table.

3. In a device of the class described, a bed including a guideway and a work supporting table adjacent thereto, a carriage mounted for longitudinal reciprocation in said guideway, a second carriage mounted on the first for lateral reciprocation relative thereto, a cutting tool mounted on the second carriage adapted to operate against work secured to the supporting table, an arm extended from the second carriage to position above the supporting table and adjacent to the cutting tool, a bar mounted for vertical reciprocation in said arm, a roller disposed at the bottom of said bar, and means for adjusting the vertical position of the bar.

Des Moines, Iowa, May 8, 1918.

ENOCH L. WILLIAMS.